United States Patent Office 3,329,004
Patented July 4, 1967

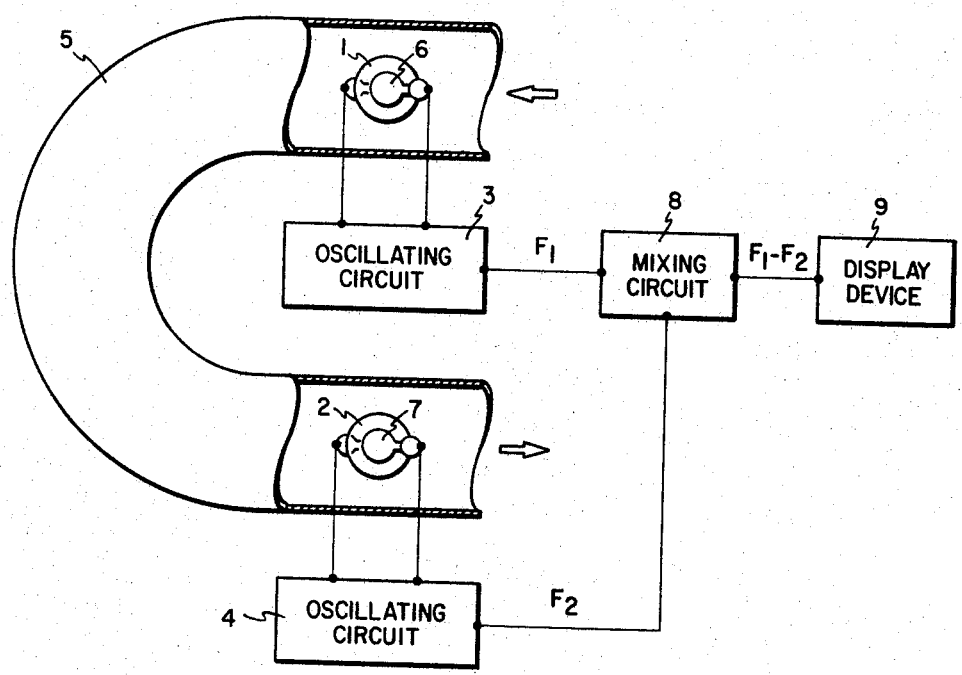

3,329,004
COATED PIEZOELECTRIC ANALYZER
William H. King, Jr., Florham Park, N.J., assignor to Esso Research and Engineering Company, a corporation of Delaware
Filed Sept. 23, 1963, Ser. No. 310,831
4 Claims. (Cl. 73—23)

This invention relates to new and improved detection devices, analyzers utilizing such detection devices, and methods and techniques utilizing the foregoing. In particular, the invention relates to coated responsive materials and analyzers containing such coated materials to analyze certain specific fluid materials, such as gases. Even more particularly, the invention relates to analyses based on detecting heats of reactions of various materials.

U.S. patent applications S.N. 110,189 filed May 15, 1961, now U.S.P. 3,164,004; S.N. 231,971 filed Oct. 22, 1962; S.N. 232,742 filed Oct. 24, 1962, now U.S.P. 3,260,-104; and S.N. 233,671 filed Oct. 29, 1963, now U.S.P. 3,266,291; all by William H. King, Jr., and S.N. 280,408 filed May 14, 1963 by Harry M. Crawford are referred to. These applications describe in detail basic principles of analysis involving the coating of a responsive material, particularly a piezoelectric crystal with a substance which interacts with a substance to be analyzed. These applications are incorporated herein by reference; however, as much of them as is necessary to understand the present invention will be repeated.

Responsive material is defined as a material that exhibits piezoelectric properties. The coated responsive material is referred to as a detection device.

In S.N 231,971, guidelines for locations and thickness of the coatings on the piezoelectric crystal responsive materials are set forth. It will be appreciated that the thickness of the coatings can vary over a wide range depending on the type of crystal, thickness of crystal, nature of response desired, etc. The essential consideration is that the thickness of coating not be so great that the oscillations of the detection device are too severely damped. Generally, the total thickness of the coating will not exceed 35% of the thickness of the crystal.

In essence, the basic principle described in these applications involves detecting the mass change of a vibrating coated piezoelectric crystal. As the coating of the crystal interacts with another component and thus changes weight, the change in weight or mass can be detected and used for determining qualitatively and quantitatively various components present. One particular embodiment of this technique was illustrated wherein water vapor was selectively measured by the use of piezoelectric crystal coated with a certain polymeric material which selectively absorbs water.

It has now been discovered that certain substances can be qualitatively and quantitatively analyzed by the use of a detection device, such as a coated piezoelectric crystal which is temperature sensitive as well as mass sensitive. Thus, for example, certain piezoelectric quartz crystals are available which have high temperature coefficients and will change their frequency in direct proportion to a change in temperature. For instance, an AC cut commercially available piezoelectric crystal will vary about 100 cycles per second per ° F. change. These crystals are extremely rugged and will operate at reasonably high temperatures, i.e. about 500 to 800° F. AT cut crystals have essentially zero temperature coefficient at room temperatures but at elevated temperatures (200° F.) the coefficient increases. Most crystals exhibit a useful temperature coefficient at some temperature so many commercially available crystals can be used.

As a specific embodiment of the present invention, the detection of hydrogen and the concomitant detection of oxygen will be detailed. It will be understood that the general principle of change of heat with chemical reactions such as heat of combustion or heat of catalytic conversion which is fully developed herein with respect to hydrogen-oxygen determinations can be suitably applied to a myriad of other situations. The reaction can either be an oxidation reaction or a reduction reaction. For instance, nitric oxide and nitrous oxide are converted to water or ammonia with a palladium catalyst at 250° C. This type of reaction can be utilized effectively with respect to ascertaining the degree of air pollution with nitric oxide and nitrous oxide. Furthermore, hydrogen can be reacted with chlorine in the presence of a palladium catalyst, $SO_2$ can be oxidized to $SO_3$ with a vanadium oxide catalyst and there are many more similar reactions.

Moreover, the invention also includes reactions wherein the material to be detected reacts with a substrate on the crystal. For instance, sulfur compounds such as $H_2S$ can be detected by coating the crystal with either silver metal, lead acetate or copper metal and reacting the sulfur compound with such coatings.

Although the specific embodiment reaction of hydrogen and oxygen is an exothermic reaction, it is to be understood that endothermic reactions are also within the scope of this invention.

In general, the most direct method of carrying out the technique of the invention is to deposit a thin film of catalyst on a piezoelectric crystal, place the crystal in an oscillating circuit, introduce the materials to be analyzed in contact with the coated crystal while the coated crystal is oscillating and detect either the change in frequency or the change in amplitude of the signal. Usually, change of frequency is preferred since this is a more sensitive signal and is adaptable to more versatile utilization.

Where two or more substances are to be reacted with each other, it is preferred that at least one of the components, which are to react to form a new compound and thus generate a change of heat either exothermically or endothermically, have a tendency to interact with the coating on the crystal prior to the reaction. This coating is generally a catalytic material, preferably a solid catalytic material.

Chemical reactions in vapor phase in the presence of solid heterocatalytic surfaces are well known. Catalytic materials, of course, are selected for the particular reaction desired. Many catalytic materials comprise elemental metals, metal oxides, silicates, phosphates and other metal-containing compounds and combinations thereof either alone, in finely divided particle form, or impregnated or coated on high temperature, organic or inorganic support carriers such as molecular sieves, which are natural or synthetic alkali or alkaline earth, alumina silicates having pore diameters of from about 3 to 15 A. glass fibers, diatomaceous earth, clays, alumina, elemental metals and metal oxides, silicates, resins, polyolefins, porcelain, vitreous materials, and the like.

Typical metal catalysts include, but are not limited to, platinum, rhodium, palladium, nickel, cobalt, iron, chromia, tungsten, iridium, vanadium, copper, zinc, tin, aluminum titanium, the rare earths, molybdenum, beryllium, zirconium, boron bismuth, and their oxides, phosphates, silicates, etc. and combinations thereof.

The theory of the method of functioning of vapor phase catalytic reactions is the sorption (adsorption, absorption, or chemisorption) of reactants upon the solid catalyst surface. The desired chemical reaction occurs at certain active catalytic sites or energy positions on the catalyst surface. For continuous analysis it is preferred that the reaction product be capable of being removed from the coating surface, for example, the catalyst surface or crystal surface, to permit the sorption of new reactants and the generation, or decrease, of heat in proportion to the reaction.

Removal can be accomplished in a variety of ways, such as reversing the chemical reaction or using a purge stream to physically strip the product from the surface of a crystal or its coating. It is contemplated that some reactions will form a product on the catalyst surface which will not be easily removable and, therefore, the analysis will be of a "single shot" type. This, of course, can be a very important type of reaction where the coated crystal is being used for a "go" or "no go" type of reaction and can also be suitably employed in the remote analysis technique described in U.S.P. 3,260,104. In brief, this technique makes use of the fact that the vibrating crystal generates a radio frequency which can be received over extremely long distances by the use of receiving equipment analogous to conventional radio receivers.

Although thus far the invention has been described particularly with relationship to reactions which are catalytically driven, it is to be understood that the invention is also applicable to those situations where the reactions take place on the surface of the coating without the necessity of catalytic activity. For instance, if the sorption coating is selected so that it will pick up one component of the reaction, the other component or components of the reaction will react with the first-named component that is present in or on the coating. One way of controlling such a reaction would be by regulating the amount of heat or cold introduced into the vicinity of the coated crystal.

This technique of measuring changes in heat on the surface of a responsive material, i.e. a piezoelectric crystal, is also operable where certain materials are attracted or chemically sorbed on a bare surface of a crystal and are, therefore, available to react with the other component or components of the reaction.

In the event that the components to be detected form a product on the catalyst coating or on the noncatalytic coating, which product is not easily desorbable, the technique of S.N. 280,408 is particularly advantageous. In that application the technique of flow switching is employed. Two matched detection devices are alternately subjected to a sample stream and to a reference stream. The reference stream is characterized by being substantially free of reactants and the reaction products. Thus, it has a tendency to purge the coating of the reaction production. The time of the flow switch is empirically determined but probably will be from about 0.1 to 120 seconds per cycle. In the flow switching technique each detection device sees either the sample stream or the reference stream alone. An individual detection device never sees both sample stream and reference stream at the same time.

Although the invention is particularly adapted for heat sensitive piezoelectric crystals it is to be understood that other heat sensitive materials can be used. For instance, semiconductor, thermisters and similar heat-sensitive semiconductors can be effectively employed.

Another facet of this invention resides in the use of temperature to detect substances like $H_2O$. Two matched, water-sensing, coated crystals (nontemperature sensitive) are used. One crystal could be used here but using 2 is simpler. One is kept dry, the other is exposed to the sample gas. The device is similar to the one described in U.S.P. 3,260,104. The temperature of both coated crystals is changed. The signal is the difference in frequency between the hot and cold temperature conditions. This device takes advantage of the fact that the amount of water absorbed is dependent upon the absolute temperature, in addition to the absolute or partial pressure.

This type of temperature cycling is another technique that can be used to overcome the hysteresis problem described in S.N. 280,408. In brief, hysteresis is the time lag between the change of composition of the material to be analyzed and the time the material interacted on the coating of the crystal comes into equilibrium with said composition.

Since, for example, sorption type interactions are characterized by relatively low sorption with coatings at high temperatures and relatively high sorptions at low temperatures, the analyzer system can be switched back and forth in a temperature cycle to overcome hysteresis.

Thus, if the coating becomes relatively saturated with sorbed material at a low temperature and the quantity of material to be analyzed is decreasing faster than the coating can come into equilibrium with the decrease, the system is cycled (usually quickly) to a higher temperature, where the sorbed material will exit from the coating quickly. Although this temperature cycling system is described particularly with respect to water analysis, it will be understood that it can be used for a wide variety of materials to be analyzed.

Moreover, not only can the temperature cycle be utilized but an analogous pressure cycle can also be used. In the pressure cycle system the pressure of the sample gas is varied. Interaction with the coatings, particularly sorption interactions, generally vary proportionately with pressures.

For instance, if this latter device is cycled from a room temperature of 75° F. to 100° F., the signal obtained would be approximately that obtained when the water concentration is changed for a factor of 4. If a cooler is used on the device, temperatures down to $-30°$ C. can be obtained in less than a minute. If the temperature is cycled from $+60°$ C. to $-30°$ C. the factor is 520. It is, therefore, quite apparent that an already very sensitive sorption detection device, which can measure 0.1 p.p.m. of water with ease, can be improved by a substantial margin by lowering the temperature. As an estimate, sensitivities of the order of $10^{-9}$ can be obtained by using a thermoelectric cooler.

Additional facets of the invention are as follows. In the high level moisture range a heated variable temperature analyzer can be used. Here, two matched, water-sensing, coated, nontemperature-sensitive crystals, one sealed (reference detection device), the other (sample detection device) exposed to the unknown gas, are employed. Conventional means are available to adjust the temperature of the sample detection device. The oscillating frequency, preferably of the sample detection device, is adjusted to match the reference detection device by adjusting the temperature of the sample detection device. The temperature is the readout. The temperature can be read with a thermometer; in the case of temperature sensitive crystals the absolute frequency of the reference crystal can be used to indicate the temperature. In the case of the temperature sensitive crystals the temperature of both crystals is changed until a temperature is obtained where the oscillations (frequencies, for instance), are matched. The frequency of the reference crystal can be used for a temperature reading in lieu of a thermometer. These analyzers present the advantages of a null-balance system together with the simplicity of temperature control.

The invention is further illustrated by referring to the description herein and the claims taken in conjunction with the accompanying drawing which is a schematic illustration of a preferred process of the invention.

Referring now to the drawing, block schematics are presented which represent a typical embodiment of the analyzer of the invention. Temperature-sensitive crystals 1 and 2, which are components of oscillating circuits 3 and 4, are located within conduit 5. Crystal 1 is coated with a thin film 6 of a catalytic material such as palladium or platinum for hydrogen-oxygen analysis. This crystal is the sample crystal. Crystal 2 is coated with an inert material 7, which is used so as to match the frequency of crystal 2 with crystal 1, prior to the introduction of the sample stream into conduit 5. The output frequencies of oscillating circuit 3 and that of oscillating circuit 4 are electrically connected to mixing circuit 8. Mixing circuit 8 is electrically connected with display device 9 which can be a meter, recorder, or other indicating means.

In operation, a sample stream containing at least one of the reactants is introduced into conduit 5 while both crystals are oscillating at approximately the same frequency. The reactants are sorbed on the surface of coating 6 where a chemical reaction takes place in such a manner as to cause the lowering of temperature or raising of temperature on the surface of the crystal. This causes the frequency of the crystal to change.

At the same time the crystal 2 is exposed to the same sample stream and does not undergo any change in frequency. The frequency from oscillating circuit 3, $F_1$, and the frequency from oscillating circuit 4, $F_2$, go into mixing circuit 8 where they are beat against each other to result in a mixing action where, in essense, the smaller signal is subtracted from the larger. From the mixing circuit a signal equal to $F_1$ minus $F_2$ passes into display device 9. This means of subtracting a smaller frequency from a larger one to result in a single net frequency, which is then measured, is referred to as the beat frequency method or means of measurement.

Detection device is defined as a heat sensitive material such as a piezoelectric crystal or thermistor diode either coated or uncoated with an adsorbent or catalytic material which changes its frequency or electrical output in direct response to a temperature change.

The invention is further illustrated by the following example.

*Example*

A hydrogen-oxygen detection device was made by depositing a very thin film of palladium on a piezoelectric quartz crystal having a temperature coefficient of 100 c.p.s. per degree of Fahrenheit. The film was evaporated on the crystal in a conventional high vacuum evaporator. The platinum film was about 2,000 A. thick. Other details are given in Table II.

A second detection device was made in an identical manner except that the thin film of material deposited was platinum instead of palladium. These detection devices were tested by injecting various quantities of hydrogen and other materials into a chromatographic carrier gas. This carrier gas was nitrogen and passed through a gas chromatograph at the rate of 50 cc./min. Prior to contacting the detection device, the carrier gas was mixed at the rate of 25 cc./min. with air. The peaks were 48 seconds wide at the base; the noise level of the detection device at 300° F. was observed to be about 0.1 cycle/second. The results of these tests are summarized in Table I.

TABLE I.—PERFORMANCE OF SELECTIVE HYDROGEN DETECTION DEVICE

| Sample Injected | Platinum Response, c.p.s. | Palladium Response, c.p.s. |
|---|---|---|
| 0.001 cc. hydrogen gas | 30 | 20 |
| 0.01 cc. hydrogen gas | | 300 |
| 0.1 cc. hydrogen gas | | 1,850 |
| 0.2 cc. hydrogen gas | | 3,900 |
| 0.5 cc. hydrogen gas | 9,300 | 9,800 |
| 0.75 cc. hydrogen gas | | 14,100 |
| 1.00 cc. hydrogen gas [1] | 18,000 | 18,900 |
| 1.0 cc. methane gas | 1.5 | 2.0 |
| 1.0 μ l. methanol liquid | 5,700 | 40 |
| 1.0 μ l. ethanol liquid | 900 | 22 |
| 1.0 μ l. acetone liquid | 5 | 2.5 |
| 1.0 μ l. pentane liquid | 10 | 2.0 |
| 1.0 μ l. benzene liquid | [2] | 1.0 |

[1] Corresponds to 4 mol percent $H_2$ in gas.
[2] −10 ads.

The characteristics of the new detection devices prepared in this example and the process in which they were used are summarized below in Table II.

TABLE II.—VITAL CHARACTERISTICS OF THE DETECTION DEVICES OF THE INVENTION

| | |
|---|---|
| Heat of combustion $H_2 \to H_2O$ | kcal./gm 29.2 |
| Heat capacity of quartz | g. cal./gm 0.188 |
| Heat conductivity of air/cm.[2] | g. cal./cm. sec. °C 7×10⁻⁵ |
| Weight of crystal | gms 0.082 |
| Area of crystal one side | cm.[2] 1.54 |
| Weight of catalyst (Pt or Pd) | micrograms 215 |
| Catalyst spots 0.015″ square on 0.025″ centers about 2,000 A. thick | |
| Temperature coefficient of AC cut crystal | c.p.s./°F 113 |
| Minimum signal observed (noise) | c.p.s ±.1 |
| Operating temperature | °F 300 |
| Gas Flow (10% $O_2$, 90% $N_2$) | cc./min 60 |
| Detector volume ⅜″ x 1″ wide x 1½″ high | cc 8 |

It can be seen from the above data and description that the detection device of the invention is capable of detecting about 1 p.p.m. of hydrogen or oxygen. The sensitivity ratio of hydrogen to methane is about 10,000 to 1.

The efficiency of combustion in the detection device of the invention is surprisingly good. This is shown by the following comparison. The signal obtained for 0.1 cc. of hydrogen corresponds to a 10° C. rise in the crystals temperature. Assuming no heat is lost by radiation or conducted to the air then 0.1 cc. of hydrogen equals 0.23 gram calories of heat available; 0.23 gram calories would cause a 15° C. temperature rise in 48 seconds (calculated); the actual observed temperature rise was about 10° C. which is a very favorable comparison.

Although the invention has been described with a certain degree of particularity, it will be understood that minor modifications and changes can be made therein without departing from the spirit of the invention as hereinafter claimed.

What is claimed is:

1. An apparatus for analyzing a fluid stream comprising electronic oscillator means having as a control element a vibratable piezoelectric material of such form as to be highly sensitive to temperature changes, means for contacting a fluid stream with said material, substrate means coated on said material to interact with at least one component of said fluid stream to thereby create a heat exchange with said material so as to change the oscillation of said oscillator means, and means for detecting changes in said oscillation.

2. An apparatus as defined by claim 1 wherein said substrate is a catalytic material.

3. An apparatus as defined by claim 1 wherein said substrate is a sorption material.

4. An apparatus as defined by claim 1 wherein said substrate is palladium.

References Cited

UNITED STATES PATENTS

| | | | |
|---|---|---|---|
| 1,559,461 | 10/1925 | Ruben | 73—26 |
| 2,571,171 | 10/1951 | Van Dyke | 73—29 |
| 2,768,069 | 10/1956 | Thompson | 73—27 X |
| 3,164,004 | 1/1965 | King | 73—23 |
| 3,194,053 | 7/1965 | Shang | 73—23 |

OTHER REFERENCES

Article: Journal of Physics and Chemistry, volume 63 (3), 1959, pp. 427–432, by Thomas et al.

RICHARD C. QUEISSER, *Primary Examiner.*